US012676009B2

(12) United States Patent
Ogawa

(10) Patent No.: US 12,676,009 B2
(45) Date of Patent: Jul. 7, 2026

(54) OBJECT RECOGNITION DEVICE

(71) Applicant: DENSO CORPORATION, Kariya-city (JP)

(72) Inventor: Takashi Ogawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 368 days.

(21) Appl. No.: 18/064,018

(22) Filed: Dec. 9, 2022

(65) Prior Publication Data

US 2023/0115115 A1    Apr. 13, 2023

Related U.S. Application Data

(63) Continuation of application No. PCT/JP2021/021039, filed on Jun. 2, 2021.

(30) Foreign Application Priority Data

Jun. 12, 2020    (JP) ................................. 2020-102523

(51) Int. Cl.
*G06K 9/00*      (2022.01)
*B60W 30/08*     (2012.01)
*G06V 20/58*     (2022.01)

(52) U.S. Cl.
CPC ............. *G06V 20/58* (2022.01); *B60W 30/08* (2013.01); *B60W 2420/408* (2024.01); *B60W 2554/4049* (2020.02)

(58) Field of Classification Search
None
See application file for complete search history.

(56) References Cited

U.S. PATENT DOCUMENTS

| | | |
|---|---|---|
| 2011/0248880 A1 | 10/2011 | Miyahara et al. |
| 2011/0282581 A1 | 11/2011 | Zeng |
| 2016/0154094 A1 | 6/2016 | Ishimaru et al. |
| 2017/0242095 A1 * | 8/2017 | Schuh .................... G08G 1/202 |
| 2019/0271551 A1 | 9/2019 | Stess |
| 2020/0379108 A1 * | 12/2020 | Vijayalingam ........ G06V 20/58 |

FOREIGN PATENT DOCUMENTS

JP        2002-040138 A      2/2002

* cited by examiner

*Primary Examiner* — Wei Wen Yang
(74) *Attorney, Agent, or Firm* — Precision Patents, P.C.

(57) ABSTRACT

An object recognition device mountable to a vehicle includes a tracking processing unit including a first association processing unit, a second association processing unit, and a vehicle likelihood calculation unit. The first association processing unit extracts, for each tracking target and based on a positional relationship, a provisionally associated cluster which is a cluster assumed to indicate the same target as the tracking target. The second association processing unit calculates a posterior confidence indicating a probability that when it is assumed that the provisionally associated cluster and the tracking target indicate the same target, the target is a vehicle, determines whether to perform association based on the calculated posterior confidence, and calculates the posterior confidence based on the posterior confidence calculated for the tracking target in the previous measurement cycle and on a cluster vehicle likelihood of the provisionally associated cluster calculated by the vehicle likelihood calculation unit.

16 Claims, 5 Drawing Sheets

FIG.1

OBJECT RECOGNITION DEVICE

CROSS-REFERENCE TO RELATED APPLICATION

The present application is a continuation application of International Application No. PCT/JP2021/021039, filed on Jun. 2, 2021, which claims priority to Japanese Patent Application No. 2020-102523, filed on Jun. 12, 2020. The contents of these applications are incorporated herein by reference in their entirety.

BACKGROUND

Technical Field

The present disclosure relates to an object recognition device.

Background Art

Known object recognition techniques include a technique for recognizing an object based on a plurality of reflection points detected by transmitting a transmission wave and receiving a reflected wave of the transmission wave. Such object recognition techniques include a known technique for preventing erroneous recognition of an object other than a vehicle as a vehicle or erroneous recognition of a vehicle as an object other than a vehicle.

SUMMARY

In the present disclosure, provided is an object recognition device mountable to a vehicle as the following.

The object recognition device includes a tracking processing unit including a first association processing unit, a second association processing unit, and a vehicle likelihood calculation unit. The first association processing unit extracts, for each tracking target and based on a positional relationship, a provisionally associated cluster which is a cluster assumed to indicate the same target as the tracking target. The second association processing unit calculates a posterior confidence and determines, based on the calculated posterior confidence, whether to perform association. The posterior confidence indicates a probability that when it is assumed that the provisionally associated cluster and the tracking target indicate the same target, the target is a vehicle. The second association processing unit calculates the posterior confidence based on the posterior confidence calculated for the tracking target in the previous measurement cycle and on a cluster vehicle likelihood of the provisionally associated cluster calculated by the vehicle likelihood calculation unit.

BRIEF DESCRIPTION OF THE DRAWINGS

FIG. 1 is a block diagram showing a configuration of an object recognition device.

DETAILED DESCRIPTION OF THE PREFERRED EMBODIMENTS

Figure 2:
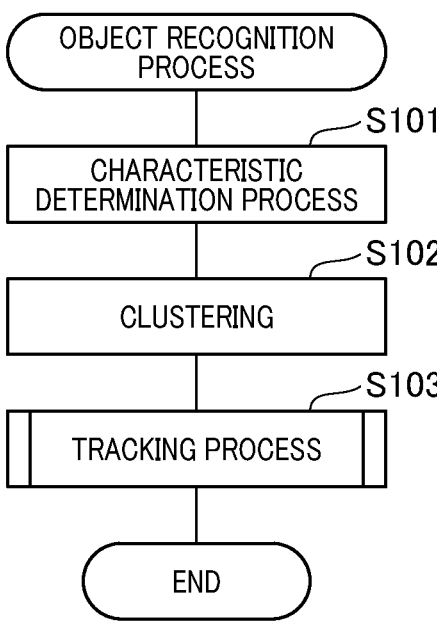
FIG. 2 is a flow chart showing the content of an object recognition process.

For example, Patent Literature 1 discloses a technique in which during operation of a wiper of a vehicle to which an object recognition device is mounted, the object recognition device performs an elimination process for eliminating noise data caused by a spatial floating matter containing water.

However, in the technique disclosed in Patent Literature 1, the elimination process for noise data is not performed in a situation where the wiper is not operated; thus, no elimination process is performed, for example, for noise generated in the case where a windshield of the vehicle has a water-repellent coating and the wiper is not used even in rain. Therefore, depending on a situation where the vehicle travels, erroneous recognition of an object other than a vehicle as a vehicle may be more likely to occur.

Thus, possible object recognition methods include a method of recognizing whether an object is a vehicle or an object other than a vehicle irrespective of the use of an external device such as a wiper. For example, Patent Literature 2 discloses a technique in which a monitoring device determines a characteristic of an object and uses the result of determination to recognize whether the object is a vehicle or an object other than a vehicle.

[PTL 1] JP 2002-40138 A

[PTL 2] JP 2015-22541 A

However, in the technique disclosed in Patent Literature 2, the result of determination of a characteristic of an object at a single time point is used to recognize whether the object is a vehicle or an object other than a vehicle. Thus, as a result of detailed studies, the inventor has found that if erroneous determination of a characteristic of an object at a single time point accidentally occurs, the object that is actually an object other than a vehicle is erroneously recognized as a vehicle or the object that is actually a vehicle is erroneously recognized as an object other than a vehicle.

An aspect of the present disclosure provides an object recognition device that uses the result of determination of a characteristic of an object at a plurality of time points to recognize whether the object is a vehicle or an object other than a vehicle, avoiding erroneous recognition of an object other than a vehicle as a vehicle and erroneous recognition of a vehicle as an object other than a vehicle.

An aspect of the present disclosure is an object recognition device mountable to a vehicle, and includes a radar unit, a characteristic determination unit, a cluster forming unit, and a tracking processing unit. The radar unit is configured to transmit a transmission wave toward a predetermined region around the vehicle and receive a reflected wave of the transmission wave for each measurement cycle set in advance. The characteristic determination unit is configured to determine, for each of reflection points based on a result of reception of the reflected wave, at least one of whether the corresponding one of the reflection points has a vehicle characteristic and whether the corresponding one of the reflection points has a non-vehicle characteristic, the vehicle characteristic being a characteristic observed in a point at which the transmission wave is reflected by a vehicle, and the non-vehicle characteristic being a characteristic observed in a point at which the transmission wave is reflected by an object other than a vehicle. The cluster forming unit is configured to perform clustering of the reflection points to form a cluster which is a set of reflection points. The tracking processing unit is configured to perform association of each of tracking targets with the cluster indicating the same target as the corresponding one of the tracking targets and recognize the cluster as the corresponding one of the tracking targets. The tracking targets are each a target as an object to be tracked. The tracking processing unit includes a first association processing unit, a second association processing unit, a target recognition unit, and a vehicle likelihood calculation unit. The first association processing unit is configured to extract, for each of the tracking targets and based on a positional relationship, a provisionally associated cluster which is the cluster assumed to indicate the same target as the corresponding one of the tracking targets. The second association processing unit is configured to calculate a posterior confidence and determine, based on the calculated posterior confidence, whether to perform the association. The posterior confidence indicates a probability that when it is assumed that the provisionally associated cluster and the corresponding one of the tracking targets indicate the same target, the target is a vehicle. The target recognition unit is configured to recognize the provisionally associated cluster as the corresponding one of the tracking targets in response to a determination by the second association processing unit to perform the association. The vehicle likelihood calculation unit is configured to calculate, for each cluster and based on the cluster and on a result of determination by the characteristic determination unit, a cluster vehicle likelihood that indicates a likelihood that the cluster indicates a vehicle. The second association processing unit is configured to calculate the posterior confidence based on the posterior confidence calculated for the corresponding one of the tracking targets in the previous measurement cycle and on the cluster vehicle likelihood of the cluster calculated by the vehicle likelihood calculation unit.

This configuration uses the result of determination of a characteristic of an object at a plurality of time points to recognize whether the object is a vehicle or an object other than a vehicle, avoiding erroneous recognition of an object other than a vehicle as a vehicle and erroneous recognition of a vehicle as an object other than a vehicle.

An exemplary embodiment of the present disclosure will be described below with reference to the drawings. The present disclosure is not limited to the following embodiment, and can be implemented in various aspects.

1. CONFIGURATION

Figure 1:
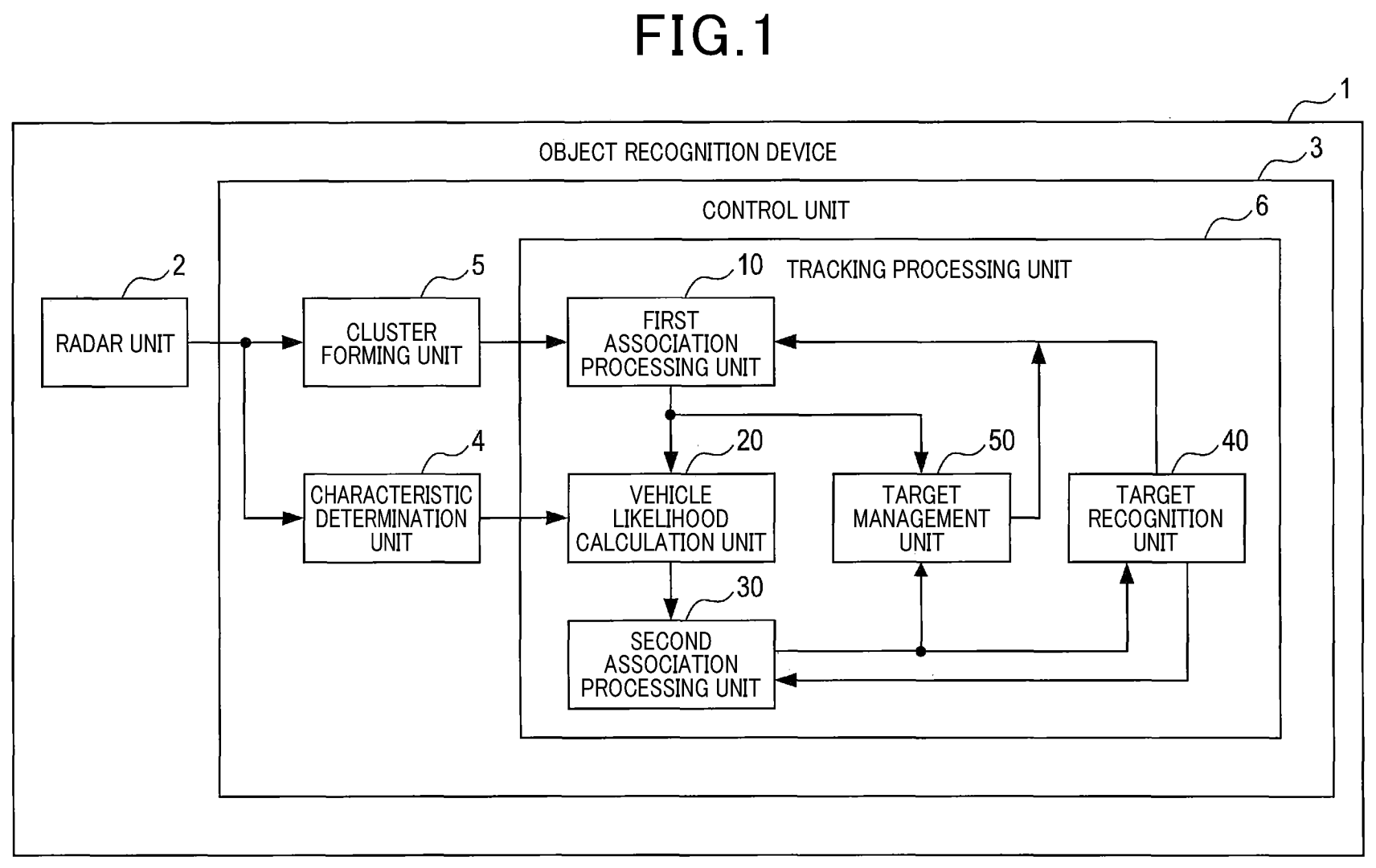

An object recognition device 1 of the embodiment will be described with reference to FIG. 1. The object recognition device 1 is a LIDAR that recognizes an object by emitting laser light as a transmission wave and receiving reflected light which is a reflected wave of the emitted laser light. LIDAR is an abbreviation for Light Detection and Ranging. The object recognition device 1 is mounted to a vehicle and used to recognize another vehicle that is present in a predetermined region around the vehicle. Hereinafter, the vehicle to which the object recognition device 1 is mounted is referred to as an own vehicle. In the present embodiment, the object recognition device 1 is used to recognize another vehicle that is present in a predetermined region in front of the own vehicle. As shown in FIG. 1, the object recognition device 1 includes a radar unit 2 and a control unit 3.

The radar unit 2 includes an emitting unit, a reception unit, and a reflection point information output unit. The emitting unit emits laser light toward a predetermined region in front of the own vehicle for each measurement cycle set in advance. The reception unit receives reflected light of the laser light emitted by the emitting unit. The reflection point information output unit outputs, to the control unit 3, reflection point information based on the direction and timing of emission of laser light by the emitting unit and on the timing and intensity of reception of reflected light by the reception unit. The reflection point information is information on a reflection point which is a point at which laser light is reflected. The reflection point information includes information indicating a three-dimensional position of a reflection point, information indicating an intensity of reflected light, and the like.

The control unit 3 is mainly composed of a known microcomputer including a CPU (not shown) and a storage unit such as a RAM, a ROM, and a flash memory (not shown). The CPU executes a program stored in the ROM which is a non-transitory tangible storage medium. When the program is executed, a method corresponding to the program is performed. Specifically, the control unit 3 performs an object recognition process shown in FIG. 2 (described later) according to the program. The control unit 3 may include a single microcomputer, or may include a plurality of microcomputers.

The control unit 3 includes a characteristic determination unit 4, a cluster forming unit 5, and a tracking processing unit 6 as functional blocks implemented when the CPU executes the program, that is, virtual components. The functions of the components of the control unit 3 may not necessarily be implemented using software, and some or all of the functions may be implemented using one or more pieces of hardware.

The characteristic determination unit 4 determines, for each reflection point indicated by the reflection point information input from the radar unit 2, whether the reflection point has a vehicle characteristic which is a characteristic observed in a point at which light is reflected by a vehicle and whether the reflection point has a non-vehicle characteristic which is a characteristic observed in a point at which light is reflected by an object other than a vehicle. Examples of an object other than a vehicle include a spatial floating matter such as water or dust.

The cluster forming unit 5 performs, based on the reflection point information input from the radar unit 2, clustering of the reflection points to form a cluster composed of a plurality of reflection points. The cluster forming unit 5 may form a plurality of clusters in a single measurement cycle.

The tracking processing unit 6 searches for, for each tracking target which is a target as an object to be tracked, a cluster indicating the same target as the tracking target. When such a cluster is found, the tracking processing unit 6 determines that the tracking target and the cluster indicate the same target and associates the tracking target with the cluster, and thus recognizes the cluster as the tracking target. The tracking processing unit 6 includes a first association processing unit 10, a vehicle likelihood calculation unit 20, a second association processing unit 30, a target recognition unit 40, and a target management unit 50.

The first association processing unit 10 extracts, for each tracking target and based on a positional relationship between the tracking target and the clusters formed by the cluster forming unit 5, a provisionally associated cluster which is a cluster assumed to indicate the same target as the tracking target. The first association processing unit 10 may extract a plurality of provisionally associated clusters for a single tracking target.

The vehicle likelihood calculation unit 20 calculates, for each provisionally associated cluster, a cluster vehicle likelihood that indicates a likelihood that the cluster indicates a vehicle. The cluster vehicle likelihood is calculated based on the result of the determination of whether the reflection point has the vehicle characteristic that is performed by the characteristic determination unit 4, on the result of the determination of whether the reflection point has the non-vehicle characteristic that is performed by the characteristic determination unit 4, and on the provisionally associated cluster extracted by the first association processing unit 10.

The second association processing unit 30 calculates a posterior confidence that indicates a probability that when it is assumed that the tracking target and the provisionally associated cluster extracted by the first association processing unit 10 indicate the same target, the target is a vehicle. When the calculated posterior confidence is higher than a threshold, the second association processing unit 30 registers the provisionally associated cluster as an association candidate for the tracking target. The second association processing unit 30 calculates the posterior confidence for all the provisionally associated clusters extracted for each tracking target.

In the case where a single provisionally associated cluster is registered as an association candidate by the second association processing unit 30, the target recognition unit 40 determines that the provisionally associated cluster indicates the same target as the tracking target, and associates the tracking target with the provisionally associated cluster. In the case where a plurality of provisionally associated clusters are registered as association candidates by the second association processing unit 30, the target recognition unit 40 extracts a single provisionally associated cluster from the provisionally associated clusters according to a predetermined condition. The target recognition unit 40 determines that the tracking target and the extracted single provisionally associated cluster indicate the same target, and associates the tracking target with the extracted single provisionally associated cluster. The target recognition unit 40 recognizes the provisionally associated cluster subjected to the association as the tracking target.

The target management unit 50 determines that among the tracking targets determined to be the objects to be tracked until the previous measurement cycle, a tracking target for which no provisionally associated cluster is extracted by the first association processing unit 10 and a tracking target for which no provisionally associated cluster is registered as an association candidate by the second association processing unit 30 are not tracking targets, and excludes such tracking targets from the objects to be tracked.

2. PROCESS

Next, the object recognition process performed by the control unit 3 will be described with reference to a flow chart shown in FIG. 2. The object recognition process is triggered by input of reflection point information from the radar unit 2. The reflection point information is input from the radar unit 2 to the control unit 3 for all the reflection points obtained by emitting laser light for a single measurement cycle.

First, in S101, the control unit 3 performs a characteristic determination process. The characteristic determination process is a process for determining, based on the reflection point information input from the radar unit 2, whether a reflection point has the vehicle characteristic described above and whether the reflection point has the non-vehicle characteristic described above.

Examples of the vehicle characteristic include three-dimensionality and medium reflectivity.

Three-dimensionality is a characteristic observed in a reflection point of light reflected by a three-dimensional object such as a vehicle. In a cluster indicating a three-dimensional object such as a vehicle, reflection points are presumably arranged in the vertical direction. Thus, it is determined that a first reflection point has three-dimensionality when a second reflection point is present in the vertical direction with respect to the first reflection point. Therefore, a reflection point having three-dimensionality is presumably highly likely to be a reflection point reflected by a vehicle.

Medium reflectivity is a characteristic observed in a reflection point of light reflected by the surface of a vehicle. In general, light reflected by the surface of a vehicle presumably has a higher intensity than light reflected by the surface of a spatial floating matter such as water or dust. Thus, it is determined that a reflection point has medium reflectivity when light reflected at the reflection point has an intensity of a predetermined value or more. Therefore, a reflection point having medium reflectivity is presumably highly likely to be a reflection point of light reflected by a vehicle.

Hereinafter, the vehicle characteristic is referred to as a label i. In this case, i indicates the type of vehicle characteristic. In the present embodiment, the label i indicates three-dimensionality where i=1, and the label i indicates medium reflectivity where i=2.

Examples of the non-vehicle characteristic include close proximity and low reflectivity.

Close proximity is a characteristic observed in a reflection point of light reflected by an object located in a range close to the own vehicle. The range close to the own vehicle here refers to a range extremely close to the own vehicle to the extent that another vehicle is generally unlikely to be present in the range. Therefore, a reflection point having close proximity is presumably highly likely to be a reflection point of light reflected by an object other than a vehicle.

Low reflectivity is a characteristic observed in a reflection point of light reflected by the surface of a spatial floating matter. In general, light reflected by the surface of a spatial floating matter such as water or dust presumably has a lower intensity than light reflected by the surface of a vehicle. Thus, it is determined that a reflection point has low reflectivity when light reflected at the reflection point has an intensity of a predetermined value or less. Therefore, a reflection point having low reflectivity is presumably highly likely to be a reflection point of light reflected by an object other than a vehicle.

Hereinafter, the non-vehicle characteristic is referred to as a label j. In this case, j indicates the type of non-vehicle characteristic. In the present embodiment, the label j indicates close proximity where j=1, and the label j indicates low reflectivity where j=2.

Of the reflection point information input from the radar unit 2, the control unit 3 uses information indicating the three-dimensional position of the reflection point to determine whether the reflection point has three-dimensionality and whether the reflection point has close proximity. Furthermore, the control unit 3 uses information indicating the intensity of the reflected light to determine whether the reflection point has medium reflectivity and whether the reflection point has low reflectivity. The characteristic determination process in S101 is performed for each reflection point. Hereinafter, the reflection point to be subjected to a process is referred to as a selected reflection point.

Figure 3:
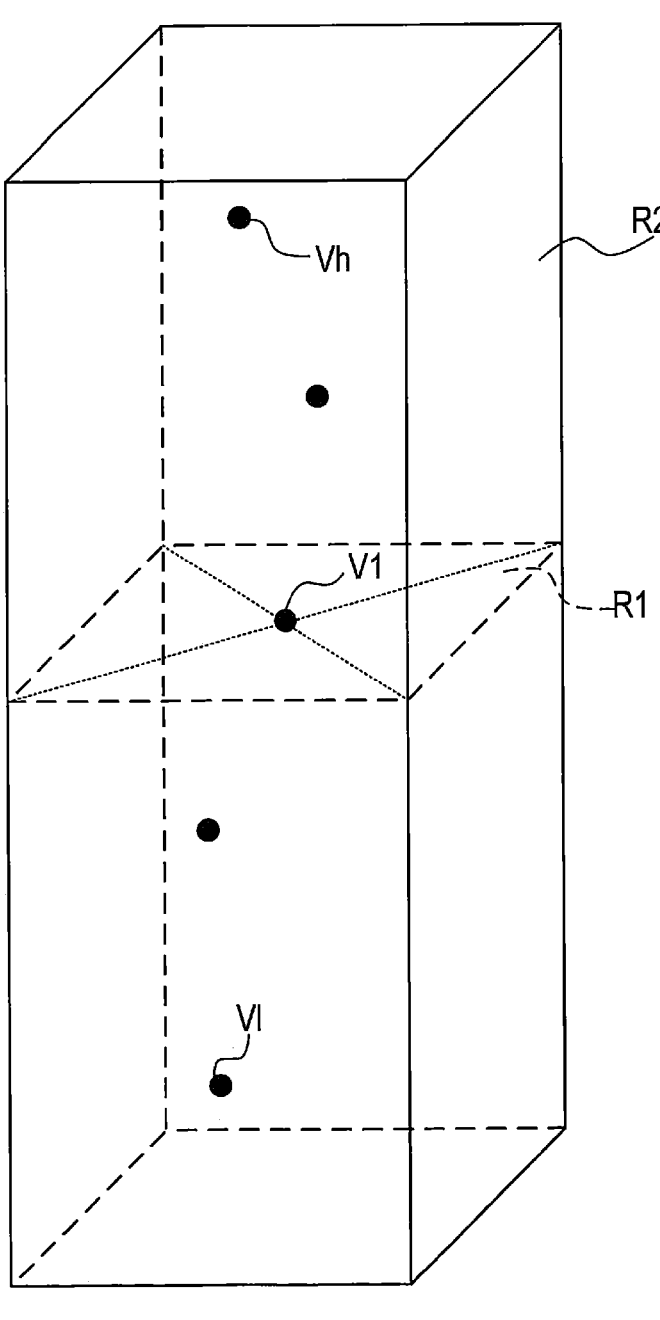
FIG. 3 is a schematic diagram showing an example in which it is determined in a characteristic determination process whether a selected reflection point has three-dimensionality.

The determination of whether the selected reflection point has three-dimensionality will be described with reference to a schematic diagram shown in FIG. 3. First, a horizontal two-dimensional region R1 whose center is a selected reflection point V1 will be described. In the present embodiment, the two-dimensional region R1 is a region indicated by a square having diagonal lines intersecting at the selected reflection point V1. Furthermore, a local region R2 is set as a three-dimensional region obtained by extending the two-dimensional region R1 in a direction perpendicular to the ground. In the present embodiment, the local region R2 has a rectangular parallelepiped shape with a predetermined size. The control unit 3 determines that the selected reflection point has three-dimensionality when a reflection point other than the selected reflection point V1 is present in the local region R2 and the reflection point satisfies a predetermined condition.

In the present embodiment, the predetermined condition is that the number of reflection points other than the selected reflection point V1 located in the local region R2 exceeds a threshold and that among the reflection points located in the local region R2, a distance between a reflection point Vh located at the highest position and a reflection point V1 located at the lowest position exceeds a threshold.

Figure 4:
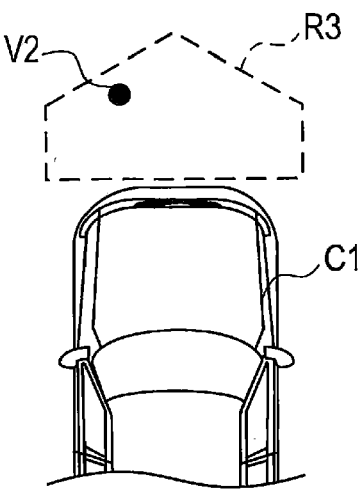
FIG. 4 is a schematic diagram showing an example in which it is determined in the characteristic determination process whether a selected reflection point has close proximity.

Next, the determination of whether the selected reflection point has close proximity will be described with reference to a schematic diagram shown in FIG. 4. When a selected reflection point V2 is present in a close region R3 which is a three-dimensional region set in advance in front of an own vehicle C1, the control unit 3 determines that the selected reflection point has close proximity. The close region R3 is a region indicating a range extremely close to the own vehicle C1 to the extent that another vehicle is generally unlikely to be present in the range. The range may be changed according to the speed of the own vehicle C1.

Figure 5:
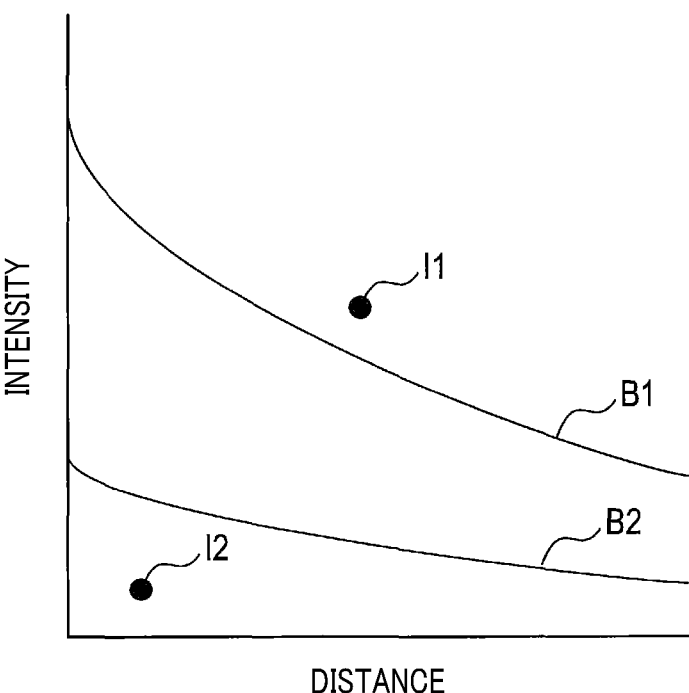
FIG. 5 is a schematic diagram showing an example in which it is determined in the characteristic determination process whether a selected reflection point has medium reflectivity and whether the selected reflection point has low reflectivity.

Next, the determination of whether the selected reflection point has medium reflectivity and whether the selected reflection point has low reflectivity will be described with reference to a schematic diagram shown in FIG. 5. The control unit 3 determines that the selected reflection point has medium reflectivity when light reflected at the selected reflection point has an intensity I1 higher than a medium reflection value B1. The medium reflection value B1 is a threshold for the intensity of the reflected light that is set so that a probability that the reflected light is light reflected by the surface of a vehicle has a predetermined value or more.

The control unit 3 determines that the selected reflection point has low reflectivity when light reflected at the selected reflection point has an intensity I2 lower than a low reflection value B2. The low reflection value B2 is a threshold for the intensity of the reflected light that is set so that a probability that the reflected light is light reflected by the surface of a spatial floating matter has a predetermined value or more. The low reflection value B2 is set to be lower than the medium reflection value B1.

In the present embodiment, the medium reflection value B1 and the low reflection value B2 are determined depending on a distance from the own vehicle to the selected reflection point. The medium reflection value B1 and the low reflection value B2 are set to become lower as the distance from the own vehicle to the selected reflection point is increased.

Referring back to FIG. 2, in S102, the control unit 3 performs, based on the reflection point information input from the radar unit 2, clustering of the reflection points to form a cluster. In the present embodiment, from all the reflection points based on the reflection point information input from the radar unit 2, the control unit 3 excludes a reflection point that is assumed to be obvious noise from the reflection point information, and the remaining reflection points are detected as effective reflection points. Then, the control unit 3 performs clustering of the effective reflection points to form a cluster.

Figure 6:
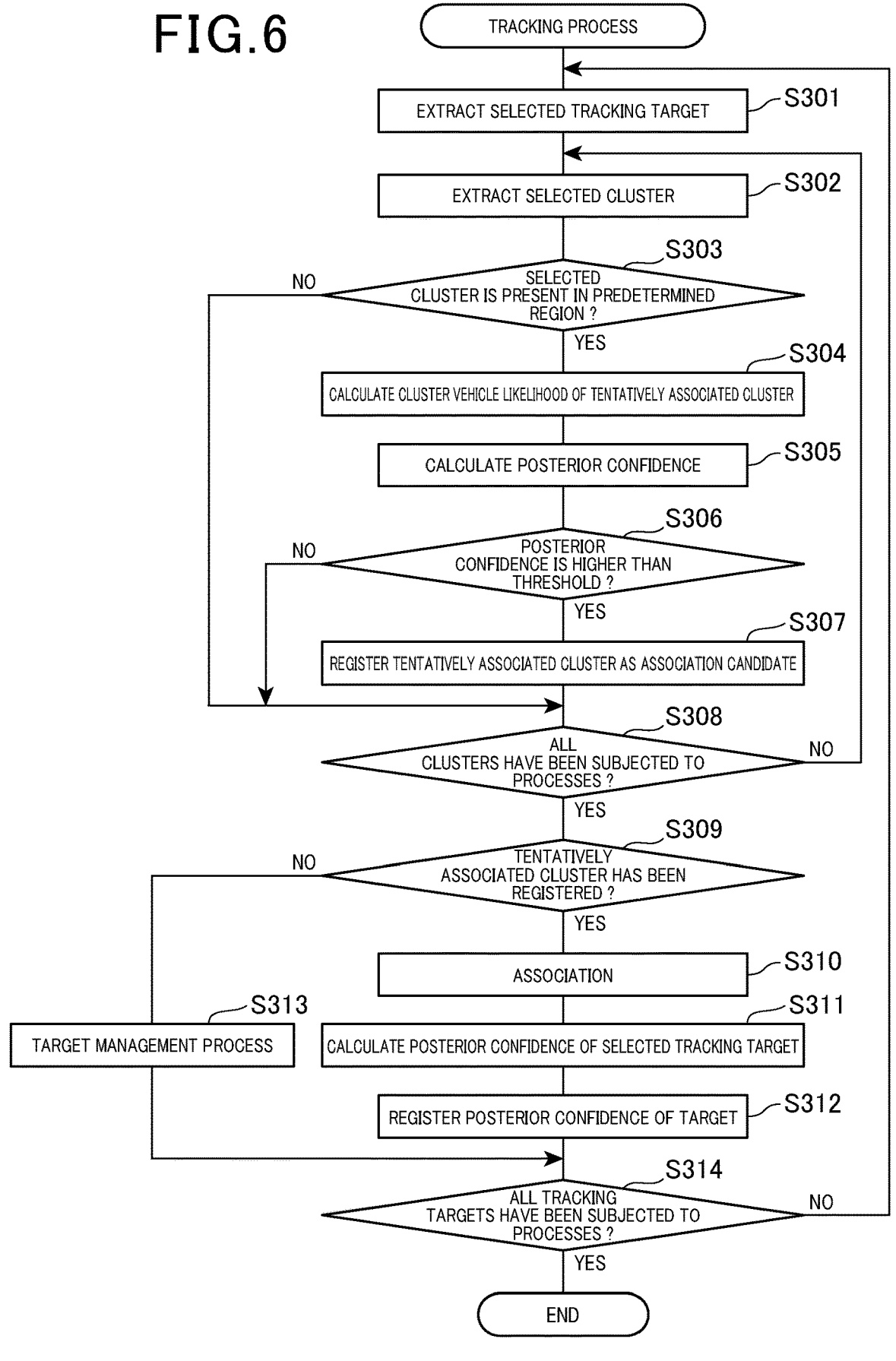
FIG. 6 is a flow chart showing the content of a tracking process.

Subsequently, in S103, the control unit 3 performs a tracking process. The tracking process is a process in which for each tracking target, a cluster indicating the same target as the tracking target is searched for, and when such a cluster is found, the tracking target and the cluster are determined to indicate the same target and are associated with each other, and the cluster is recognized as the tracking target. The tracking process will be described below with reference to a flow chart shown in FIG. 6.

First, in S301, the control unit 3 extracts a single tracking target as a selected tracking target from the tracking targets that have not yet been subjected to the tracking process in the current measurement cycle.

Subsequently, in S302, the control unit 3 extracts a single cluster as a selected cluster from the clusters that have not yet been subjected to processes in S303 to S307 of the clusters formed in S102.

Then, in S303, the control unit 3 determines whether the selected cluster extracted in S302 is present in a predetermined region whose center is located at an expected position which is a position at which the selected tracking target is expected to be present in the current measurement cycle. The expected position of the selected tracking target is calculated based on the position and speed of the selected tracking target in the previous measurement cycle. The expected position of the selected tracking target may be calculated based on the acceleration of the selected tracking target in the previous measurement cycle, in addition to the position and speed of the selected tracking target in the previous measurement cycle. When the control unit 3 determines that the selected cluster is present in the predetermined region whose center is located at the expected position, control proceeds to S304. On the other hand, when the control unit 3 determines that the selected cluster is not present in the predetermined region whose center is located at the expected position, control proceeds to S308. Hereinafter, the selected cluster determined to be present in the predetermined region whose center is located at the expected position is referred to as the provisionally associated cluster.

In S304, the control unit 3 calculates a cluster vehicle likelihood of the provisionally associated cluster subjected to the determination in S303. A specific calculation method will be described below.

First, the control unit 3 calculates a vehicle probability $L_i^P$ based on the label i for the provisionally associated cluster. The vehicle probability $L_i^P$ based on the label i is calculated by Equation 1 using a presence ratio of the label i that is a ratio of the number $n_i^P$ of reflection points having the label i to the total number $N^P$ of reflection points constituting the provisionally associated cluster. The vehicle probability $L_i^P$ based on the label i is calculated for each type of vehicle characteristic. That is, in the present embodiment, the vehicle probability based on three-dimensionality and the vehicle probability based on medium reflectivity are each calculated.

[Math. 1]

$$L_i^P = \frac{2\left(n_i^P/N^P\right) - 1}{2\left(1 + \left|2\left(n_i^P/N^P\right) - 1\right|\right)} + 0.75 \qquad \text{(Equation 1)}$$

Furthermore, the control unit 3 calculates a vehicle probability $L_j^N$ based on the label j for the provisionally associated cluster. The vehicle probability $L_j^N$ based on the label j is calculated by Equation 2 using a presence ratio of the label j that is a ratio of the number $n_j^N$ of reflection points having the label j to the total number $N^N$ of all the reflection points that are present in a region composed of the provisionally associated cluster. The vehicle probability $L_j^N$ based on the label j is calculated for each type of non-vehicle characteristic. That is, in the present embodiment, the vehicle probability based on close proximity and the vehicle probability based on low reflectivity are each calculated.

[Math. 2]

$$L_j^N = -\frac{2\left(n_j^N/N^N\right) - 1}{2\left(1 + \left|2\left(n_j^N/N^N\right) - 1\right|\right)} + 0.25 \qquad \text{(Equation 2)}$$

Furthermore, the control unit 3 combines and normalizes the vehicle probability $L_i^P$ based on the label i calculated by the method described above and the vehicle probability $L_j^N$ based on the label j calculated by the method described above to calculate a cluster vehicle likelihood $L_k$ of the provisionally associated cluster. Specifically, the cluster vehicle likelihood $L_k$ is calculated by Equation 3 using the infinite product of the vehicle probability $L_i^P$ based on the label i calculated for each type of vehicle characteristic and the infinite product of the vehicle probability $L_j^N$ based on the label j calculated for each type of non-vehicle characteristic.

[Math. 3]

$$L_k = \frac{\prod_{i=1}^{N_i} L_i^P}{\prod_{i=1}^{N_i} L_i^P + \prod_{j=1}^{N_j}\left(1 - L_j^N\right)} \qquad \text{(Equation 3)}$$

Then, in S305, the control unit 3 calculates a posterior confidence that indicates a probability that when it is assumed that the provisionally associated cluster and the selected tracking target indicate the same target, the target is a vehicle. A specific calculation method will be described below.

The control unit 3 uses the posterior confidence registered in S312 in the previous measurement cycle as a prior confidence in the current measurement cycle, and calculates the posterior confidence in the current measurement cycle by Bayesian estimation using the prior confidence and the cluster vehicle likelihood $L_k$ of the provisionally associated cluster calculated in S304.

In the present embodiment, the posterior confidence calculated in the previous measurement cycle is updated considering time elapsed from the previous measurement cycle, and the updated posterior confidence is used as the prior confidence in the current measurement cycle. Specifically, the control unit 3 multiplies a posterior confidence $P_{k-1|k-1}$ calculated in the previous measurement cycle by a time transition model T which is a matrix, and updates the posterior confidence by Equation 4. The posterior confidence updated by Equation 4 is used as a prior confidence $P_{k|k-1}$ in the current measurement cycle.

[Math. 4]

$$P_{k|k-1} = t_{pp}P_{k-1|k-1} + t_{np}\left(1 - P_{k-1|k-1}\right) \qquad \text{(Equation 4)}$$

The time transition model T is represented by Equation 5. Elements constituting the matrix are values set in advance. In the present embodiment, the elements constituting the time transition model T are set so that the posterior confidence approaches 0.5 when the posterior confidence is updated by Equation 4. For example, the elements may be set so that $t_{pp}$=0.9 and $t_{np}$=0.1.

[Math. 5]

$$T = \begin{bmatrix} t_{pp} & t_{np} \\ t_{pn} & t_{nn} \end{bmatrix} \qquad \text{(Equation 5)}$$

Then, the control unit 3 calculates a posterior confidence $P_{k|k}$ by Equation 6 using the cluster vehicle likelihood $L_k$ calculated in S304 and the prior confidence $P_{k|k-1}$.

[Math. 6]

$$P_{k|k} = \frac{L_k P_{k|k-1}}{L_k P_{k|k-1} + (1 - L_k)\left(1 - P_{k|k-1}\right)} \qquad \text{(Equation 6)}$$

Subsequently, in S306, the control unit 3 determines whether the posterior confidence calculated in S305 is higher than a threshold. When the control unit 3 determines that the posterior confidence is higher than the threshold, control proceeds to S307. On the other hand, when the control unit 3 determines that the posterior confidence is not higher than the threshold, control proceeds to S308.

In S307, the control unit 3 registers, in the storage unit, the provisionally associated cluster as an association candidate for the selected tracking target, and after registration, control proceeds to S308.

In S308, the control unit 3 determines whether all the clusters formed in S102 have been subjected to the processes in S303 to S307. When the control unit 3 determines that there is a cluster that has not been subjected to the processes in S303 to S307 among the clusters formed in S102, control returns to S302. When the control unit 3 determines that all the clusters have been subjected to the processes in S303 to S307, control proceeds to S309.

In S309, the control unit 3 determines whether in S307, a provisionally associated cluster has been registered in the storage unit as an association candidate for the selected tracking target. When the control unit 3 determines that a provisionally associated cluster has been registered in the storage unit as an association candidate for the selected tracking target, control proceeds to S310. When the control unit 3 determines that no provisionally associated cluster has been registered in the storage unit as an association candidate for the selected tracking target, control proceeds to S313.

In the case where a single provisionally associated cluster has been registered as an association candidate in the storage unit, in S310, the control unit 3 determines that the provisionally associated cluster indicates the same target as the selected tracking target, and associates the selected tracking target with the provisionally associated cluster. In the case where a plurality of provisionally associated clusters have been registered as association candidates, the control unit 3 extracts a single provisionally associated cluster from the provisionally associated clusters according to a predetermined condition. Then, the control unit 3 determines that the extracted single provisionally associated cluster indicates the same target as the selected tracking target, and associates the selected tracking target with the extracted single provisionally associated cluster. The control unit 3 may extract a single provisionally associated cluster from the plurality of provisionally associated clusters registered as association candidates in the storage unit, for example, by extracting a provisionally associated cluster located at the position closest to the selected tracking target.

Subsequently, in S311, in the same manner as in the process in S304, the control unit 3 calculates a cluster vehicle likelihood of the provisionally associated cluster subjected to the association in S310. Then, in the same manner as in the process in S305, the control unit 3 calculates, using the calculated cluster vehicle likelihood, a posterior confidence of the selected tracking target subjected to the association in S310.

Subsequently, in S312, the control unit 3 registers, in the storage unit, the posterior confidence of the selected tracking target calculated in S311, and control proceeds to S314.

In S313, the control unit 3 performs a target management process for the selected tracking target for which no provisionally associated cluster is determined to be present in S309. The target management process includes an extrapolation process and a target exclusion process. In the extrapolation process of the present embodiment, the selected tracking target is assumed to have moved to the expected position calculated in S301 in the current measurement cycle, and the control unit 3 updates the position of the selected tracking target. In the target exclusion process of the present embodiment, the upper limit of the number of times the selected tracking target is subjected to the target management process is set in advance, and the control unit 3 excludes, from the objects to be tracked, a selected tracking target to be subjected to the target management process in S313 a number of times exceeding the set upper limit of the number of times. In other words, in the target exclusion process of the present embodiment, the control unit 3 excludes, from the objects to be tracked, a selected tracking target for which no provisionally associated cluster is present for a predetermined time or more. The upper limit of the number of times may be zero. That is, the control unit 3 may immediately exclude, from the objects to be tracked, a selected tracking target to be subjected to the process in S313. Then, the control unit 3 causes control to proceed to S314.

In S314, the control unit 3 determines whether all the tracking targets have been subjected to the processes in S309 to S312. When the control unit 3 determines that there is a tracking target which has not been subjected to the processes in S309 to S312, control returns to S301. When the control unit 3 determines that all the tracking targets have been subjected to the processes in S309 to S312, the tracking process is ended.

Referring back to FIG. 2, when the tracking process in S103 is ended, the control unit 3 ends the object recognition process.

3. EFFECTS

The embodiment described in detail above provides the following effects.

(3a) The object recognition device 1 is configured to perform, for each tracking target, association of the tracking target with the provisionally associated cluster assumed to indicate the same target as the tracking target and recognize the provisionally associated cluster as the tracking target. Furthermore, the object recognition device 1 is configured to calculate the posterior confidence that indicates the probability that when it is assumed that the provisionally associated cluster and the tracking target indicate the same target, the target is a vehicle and determine, based on the calculated posterior confidence, whether to perform the association. Specifically, the object recognition device 1 is configured to calculate the posterior confidence based on the posterior confidence calculated for the tracking target in the previous measurement cycle and on the cluster vehicle likelihood of the provisionally associated cluster.

This configuration can achieve higher robustness of recognition than in a recognition method in which the object recognition device 1 uses only the cluster vehicle likelihood of the provisionally associated cluster at a single time point to recognize whether the provisionally associated cluster indicates a vehicle or an object other than a vehicle.

For example, if the calculated cluster vehicle likelihood of a provisionally associated cluster is high although the provisionally associated cluster is actually a cluster indicating an object other than a vehicle, in the above recognition method, the provisionally associated cluster is recognized as a cluster indicating a vehicle. On the other hand, in the embodiment of the present disclosure, when the calculated posterior confidence is not higher than the threshold, it is possible to avoid erroneous recognition of the provisionally associated cluster as a cluster indicating a vehicle. Furthermore, if the calculated cluster vehicle likelihood of a provisionally associated cluster is low although the provisionally associated cluster is actually a cluster indicating a vehicle, in the above recognition method, the provisionally associated cluster is recognized as a cluster indicating an object other than a vehicle. On the other hand, in the embodiment of the present disclosure, when the calculated posterior confidence is higher than the threshold, it is possible to avoid recognition of the provisionally associated cluster as a cluster indicating an object other than a vehicle.

(3b) The object recognition device 1 is configured to determine, for each reflection point, whether the reflection point has the vehicle characteristic which is the characteristic observed in a point at which light is reflected by a vehicle and whether the reflection point has the non-vehicle characteristic which is the characteristic observed in a point at which light is reflected by an object other than a vehicle.

This configuration allows the object recognition device 1 to combine the vehicle probability based on the vehicle characteristic with the vehicle probability based on the non-vehicle characteristic to calculate the cluster vehicle likelihood, improving the accuracy of calculation of the cluster vehicle likelihood.

(3c) The object recognition device 1 is configured to exclude, from the objects to be tracked, a tracking target with which no provisionally associated cluster is determined to be associated.

This configuration can avoid continuous tracking of a cluster indicating an object other than a vehicle.

4. OTHER EMBODIMENTS

The embodiment of the present disclosure has been described above. However, it is needless to say that the present disclosure is not limited to the above embodiment, and may be implemented in various forms.

(4a) In the above embodiment, a LIDAR that recognizes an object by emitting laser light as a transmission wave and receiving reflected light which is a reflected wave of the emitted laser light is shown as an example of the object recognition device 1; however, the object recognition device 1 is not limited to this. The object recognition device 1 may be, for example, another distance measuring sensor. Examples of another distance measuring sensor include a stereo camera.

(4b) The above embodiment shows, as an example, the configuration in which the vehicle likelihood calculation unit 20 calculates the cluster vehicle likelihood based on the result of determination by the characteristic determination unit 4 and on the provisionally associated cluster. That is, in the above embodiment, the cluster vehicle likelihood is calculated only for the provisionally associated cluster of the clusters formed by the cluster forming unit 5. However, the cluster for which the cluster vehicle likelihood is calculated is not limited only to the provisionally associated cluster. The cluster vehicle likelihood may be calculated, for example, for each of all the clusters formed by the cluster forming unit 5.

(4c) In the above embodiment, the process in which the control unit 3 determines whether the reflection point has the vehicle characteristic and whether the reflection point has the non-vehicle characteristic is shown as an example of the characteristic determination process; however, the characteristic determination process is not limited to this. In the characteristic determination process, the control unit 3 may determine only whether the reflection point has the vehicle characteristic without determining whether the reflection point has the non-vehicle characteristic. Alternatively, in the characteristic determination process, the control unit 3 may determine only whether the reflection point has the non-vehicle characteristic without determining whether the reflection point has the vehicle characteristic.

(4d) In the above embodiment, three-dimensionality and medium reflectivity are shown as examples of the vehicle characteristic; however, the vehicle characteristic is not limited to these. The vehicle characteristic may be another characteristic that is observed in a point at which light is reflected by a vehicle and is not observed in a point at which light is reflected by an object other than a vehicle. In the above embodiment, the two types of vehicle characteristics are shown as examples; however, the number of types of vehicle characteristics is not limited to this. For example, one type of vehicle characteristic or three or more types of vehicle characteristics may be used.

(4e) In the above embodiment, close proximity and low reflectivity are shown as examples of the non-vehicle characteristic; however, the non-vehicle characteristic is not limited to these. The non-vehicle characteristic may be another characteristic that is observed in a point at which light is reflected by an object other than a vehicle and is not observed in a point at which light is reflected by a vehicle. In the above embodiment, the two types of non-vehicle characteristics are shown as examples; however, the number of types of non-vehicle characteristics is not limited to this. For example, one type of non-vehicle characteristic or three or more types of non-vehicle characteristics may be used.

(4f) In the above embodiment, in the determination of whether the selected reflection point has three-dimensionality, the region indicated by a square whose diagonal lines intersect at the selected reflection point V1 is set as the horizontal two-dimensional region R1 whose center is the selected reflection point V1; however, the two-dimensional region R1 is not limited to this. The two-dimensional region R1 may be, for example, a region indicated by a circle whose center is the selected reflection point V1.

(4g) In the above embodiment, in the determination of whether the selected reflection point has three-dimensionality, the local region R2 is set to have a rectangular parallelepiped shape with a predetermined size; however, the local region R2 may have a shape other than the rectangular parallelepiped shape.

(4h) In the above embodiment, the process in which the control unit 3 performs clustering of the effective reflection points to form a cluster is shown as an example of the process in S102; however, the process in S102 is not limited to this. In S102, for example, the control unit 3 may perform clustering of all the reflection points based on the reflection point information input from the radar unit 2 to form a cluster.

(4i) In the above embodiment, the control unit 3 uses Equation 1 to calculate the vehicle probability $L_i^P$ based on the label i; however, Equation 1 disclosed is an example, and the calculation of the vehicle probability $L_i^P$ based on the label i is not limited to this. The control unit 3 uses, as a population, the reflection points constituting the provisionally associated cluster to calculate, by Equation 1, the presence ratio of the label i that is the ratio of the number $n_i^P$ of reflection points having the label i in the population to the total number $N^P$ of reflection points in the population. However, for example, the control unit 3 may use, as a single population, the reflection points constituting the provisionally associated cluster and an effective reflection point that is present in a region neighboring the provisionally associated cluster to calculate the presence ratio of the label i. Furthermore, the control unit 3 may use another relational expression in which the vehicle probability $L_i^P$ based on the label i is increased with an increase in the number of reflection points having the label i to calculate the vehicle probability $L_i^P$ based on the label i. The vehicle probability $L_i^P$ based on the label i may be, for example, the number of reflection points having the label i.

(4j) In the above embodiment, the control unit 3 uses Equation 2 to calculate the vehicle probability $L_j^N$ based on the label j; however, Equation 2 disclosed is an example, and the calculation of the vehicle probability $L_j^N$ based on the label j is not limited to this. The control unit 3 uses, as a population, all the reflection points that are present in the region composed of the provisionally associated cluster to calculate, by Equation 2, the presence ratio of the label j that is the ratio of the number $n_j^N$ of reflection points having the label j in the population to the total number $N^N$ of reflection points in the population. However, for example, the control unit 3 may use, as a population, all the reflection points that are present in the region composed of the provisionally associated cluster and its neighboring region to calculate the presence ratio of the label j. Furthermore, the control unit 3 may use another relational expression in which the vehicle probability $L_j^N$ based on the label j is reduced with an increase in the number of reflection points having the label j to calculate the vehicle probability $L_j^N$ based on the label j. The vehicle probability $L_j^N$ based on the label j may be, for example, the number of reflection points having the label j.

(4k) In the above embodiment, the control unit 3 multiplies the posterior confidence $P_{k-1|k-1}$ calculated in the previous measurement cycle by the time transition model T to update the posterior confidence, and uses the updated posterior confidence as the prior confidence $P_{k|k-1}$ in the current measurement cycle; however, the prior confidence $P_{k|k-1}$ is not limited to this. For example, the control unit 3 may use, as the prior confidence $P_{k|k-1}$ in the current measurement cycle, the posterior confidence calculated in the previous measurement cycle without updating the posterior confidence.

(4l) In the above embodiment, $t_{pp}=0.9$ and $t_{np}=0.1$ are shown as examples of the elements constituting the time transition model T; however, the elements constituting the time transition model T are not limited to these. For example, the elements constituting the time transition model T may be other values set so that the posterior confidence approaches 0.5 when the posterior confidence is updated by Equation 4.

(4m) In the above embodiment, in S310, the method in which the control unit 3 extracts the provisionally associated cluster located at the position closest to the selected tracking target is shown as an example of the method in which the control unit 3 extracts a single provisionally associated cluster from the plurality of provisionally associated clusters registered as association candidates in the storage unit; however, the extraction method is not limited to this. The control unit 3 may extract a single provisionally associated cluster from the plurality of provisionally associated clusters registered as association candidates in the storage unit, for example, by extracting a provisionally associated cluster whose posterior confidence calculated in S305 is highest.

(4n) In the above embodiment, the process in which the control unit 3 registers, in the storage unit, the posterior confidence of the selected tracking target calculated in S311 is shown as an example of the process in S312; however, the process in S312 is not limited to this. In S312, for example, the control unit 3 may register, in the storage unit, the posterior confidence of the selected tracking target calculated in S305. In such a case, the posterior confidence of the selected tracking target does not need to be calculated in S311; thus, the process in S311 can be omitted.

(4o) In the above embodiment, the specific content of the process in S313 in which the control unit 3 excludes the selected tracking target from the objects to be tracked is not particularly limited. The control unit 3 may exclude the selected tracking target from the objects to be tracked, for example, by removing the selected tracking target from a list of objects to be tracked that is registered in the storage unit. Alternatively, for example, the control unit 3 may add a label or the like to the selected tracking target for identification without removing the selected tracking target. In such a case, an application at a later stage or the like can determine whether to remove the selected tracking target from the objects to be tracked.

(4p) In the above embodiment, the function of a single component may be divided into a plurality of components, or the functions of a plurality of components may be integrated into a single component. Furthermore, part of the configuration of the above embodiment may be omitted. Furthermore, at least part of the configuration of the above embodiment may be, for example, added to or replaced with another configuration of the above embodiment.

(4q) Other than the object recognition device 1 described above, the present disclosure may also be implemented in various forms such as the control unit 3 of the object recognition device 1, a program for causing a computer to function as the control unit 3, a medium in which the program is recorded, and an object recognition method.

What is claimed is:
1. An object recognition device mountable to a vehicle, the object recognition device comprising:

a radar unit configured to transmit a transmission wave toward a predetermined region around the vehicle and receive a reflected wave of the transmission wave for each measurement cycle set in advance;

a characteristic determination unit configured to determine, for each of reflection points based on a result of reception of the reflected wave, at least one of whether the corresponding one of the reflection points has a vehicle characteristic and whether the corresponding one of the reflection points has a non-vehicle characteristic, the vehicle characteristic being a characteristic observed in a point at which the transmission wave is reflected by a vehicle, and the non-vehicle characteristic being a characteristic observed in a point at which the transmission wave is reflected by an object other than a vehicle;

a cluster forming unit configured to perform clustering of the reflection points to form a cluster which is a set of the reflection points; and a tracking processing unit configured to perform association of each of tracking targets with a cluster corresponding to a respective one of each of the tracking targets and recognize the cluster as the corresponding one of the tracking targets, the tracking targets each being a target as an object to be tracked, wherein the tracking processing unit includes a first association processing unit configured to extract a provisionally associated cluster, in a current measurement cycle, for each of the tracking targets in a previous measurement cycle, wherein the provisionally associated cluster is a cluster assumed to correspond to a respective one of each of the tracking targets, wherein the tracking targets have not yet been subjected to tracking in the current measurement cycle, and the provisionally associated cluster has not yet been associated with a corresponding tracking target in the current measurement cycle, wherein the provisionally associated cluster is extracted based on a positional relationship, a second association processing unit configured to
calculate a posterior confidence in the current measurement cycle, the posterior confidence indicating a probability that, when it is assumed that the provisionally associated cluster and the corresponding one of the tracking targets indicate the same target, the target is a vehicle, and
determine, based on the calculated posterior confidence, whether to perform the association in which the provisionally associated cluster is associated with the corresponding tracking target, a target recognition unit configured to recognize the provisionally associated cluster as the corresponding one of the tracking targets in response to a determination by the second association processing unit to perform the association, and a vehicle likelihood calculation unit configured to calculate, for each cluster and based on the cluster and on a result of determination by the characteristic determination unit, a cluster vehicle likelihood that indicates a likelihood that the cluster indicates a vehicle, and the second association processing unit is configured to calculate the posterior confidence in the current measurement cycle based on the posterior confidence calculated for the corresponding one of the tracking targets in the previous measurement cycle and on the cluster vehicle likelihood of the cluster calculated by the vehicle likelihood calculation unit.

2. The object recognition device according to claim 1, wherein the vehicle likelihood calculation unit is configured to calculate the cluster vehicle likelihood for each cluster based on at least one of a presence ratio of one or more of the reflection points having the vehicle characteristic in the cluster and a presence ratio of one or more of the reflection points having the non-vehicle characteristic in the cluster.

3. The object recognition device according to claim 1, wherein the characteristic determination unit is configured to determine, for each of the reflection points, whether the corresponding one of the reflection points has the vehicle characteristic and whether the corresponding one of the reflection points has the non-vehicle characteristic.

4. The object recognition device according to claim 1, wherein the tracking processing unit further includes a target management unit configured to exclude, from objects to be tracked, a tracking target for which there is no provisionally associated cluster determined to perform the association by the second association processing unit.

5. The object recognition device according to claim 1, wherein the second association processing unit is configured to in response to the calculated posterior confidence being higher than a threshold, register the provisionally associated cluster as an association candidate for the corresponding one of the tracking targets.

6. The object recognition device according to claim 1, wherein the second association processing unit is configured to calculate the posterior confidence for all provisionally associated clusters extracted for each of the tracking targets.

7. An object recognition device mountable to a vehicle, the object recognition device comprising:

a processor;

a non-transitory computer-readable storage medium; and a set of computer-executable instructions stored on the non-transitory computer-readable storage medium that cause the processor to:

receive reflection point information of reflection points obtained by transmitting a transmission wave toward a predetermined region around the vehicle and receiving a reflected wave of the transmission wave for each measurement cycle set in advance;

determine, for each of the reflection points based on a result of reception of the reflected wave, at least one of whether the corresponding one of the reflection points has a vehicle characteristic and whether the corresponding one of the reflection points has a non-vehicle characteristic, the vehicle characteristic being a characteristic observed in a point at which the transmission wave is reflected by a vehicle, and the non-vehicle characteristic being a characteristic observed in a point at which the transmission wave is reflected by an object other than a vehicle;

perform clustering of the reflection points to form a cluster which is a set of the reflection points; and perform association of each of tracking targets with a cluster corresponding to a respective one of each of the tracking targets and recognize the cluster as the corresponding one of the tracking targets, the tracking targets each being a target as an object to be tracked, wherein performing of the association of each of tracking targets includes:

extracting a provisionally associated cluster, in a current measurement cycle, for each of the tracking targets in a previous measurement cycle, wherein the provisionally associated cluster is a cluster assumed to correspond to a respective one of each of the tracking targets, wherein the tracking targets have not yet been subjected to tracking in the current measurement cycle, and the provisionally associated cluster has not yet been associated with a corresponding tracking target in the current measurement cycle, wherein the provisionally associated cluster is extracted based on a positional relationship, calculating a posterior confidence in the current measurement cycle, the posterior confidence indicating a probability that, when it is assumed that the provisionally associated cluster and the corresponding one of the tracking targets indicate the same target, the target is a vehicle, and determining, based on the calculated posterior confidence, whether to perform the association in which the provisionally associated cluster is associated with the corresponding tracking target, recognizing the provisionally associated cluster as the corresponding one of the tracking targets in response to a determination to perform the association, and calculating, for each cluster and based on the cluster and on a result of determination of whether the corresponding one of the reflection points has the vehicle characteristic, a cluster vehicle likelihood that indicates a likelihood that the cluster indicates a vehicle, wherein the posterior confidence in the current measurement cycle is calculated based on the posterior confidence calculated for the corresponding one of the tracking targets in the previous measurement cycle and on the cluster vehicle likelihood of the cluster.

8. The object recognition device according to claim 7, wherein the set of computer-executable instructions further cause the processor to calculate the cluster vehicle likelihood for each cluster based on at least one of a presence ratio of one or more of the reflection points having the vehicle characteristic in the cluster and a presence ratio of one or more of the reflection points having the non-vehicle characteristic in the cluster.

9. The object recognition device according to claim 7, wherein the set of computer-executable instructions further cause the processor to determine, for each of the reflection points, whether the corresponding one of the reflection points has the vehicle characteristic and whether the corresponding one of the reflection points has the non-vehicle characteristic.

10. The object recognition device according to claim 7, wherein the set of computer-executable instructions further cause the processor to exclude, from objects to be tracked, a tracking target for which there is no provisionally associated cluster determined to perform the association.

11. The object recognition device according to claim 7, wherein the set of computer-executable instructions further cause the processor to in response to the calculated posterior confidence being higher than a threshold, register the provisionally associated cluster as an association candidate for the corresponding one of the tracking targets.

12. The object recognition device according to claim 7, wherein the set of computer-executable instructions further cause the processor to calculate the posterior confidence for all provisionally associated clusters extracted for each of the tracking targets.

13. The object recognition device according to claim 1, wherein the second association processing unit is configured to:

determine whether the calculated posterior confidence is higher than a posterior confidence threshold; and in response to the calculated posterior confidence being higher than the posterior confidence threshold, register the provisionally associated cluster as an association candidate for the corresponding one of the tracking targets.

14. The object recognition device according to claim 1, wherein the second association processing unit is configured to:

determine whether the calculated posterior confidence is lower than or equal to a posterior confidence threshold; and in response to the calculated posterior confidence being lower than or equal to the posterior confidence threshold, refrain from associating the provisionally associated cluster with the corresponding one of the tracking targets.

15. The object recognition device according to claim 7, wherein the set of computer-executable instructions further cause the processor to:

determine whether the calculated posterior confidence is higher than a posterior confidence threshold; and in response to the calculated posterior confidence being higher than the posterior confidence threshold, register the provisionally associated cluster as an association candidate for the corresponding one of the tracking targets.

16. The object recognition device according to claim 7, wherein the set of computer-executable instructions further cause the processor to:

determine whether the calculated posterior confidence is lower than or equal to a posterior confidence threshold; and in response to the calculated posterior confidence being lower than or equal to the posterior confidence threshold, refrain from associating the provisionally associated cluster with the corresponding one of the tracking targets.

* * * * *